United States Patent
Watson et al.

(10) Patent No.: US 7,375,680 B2
(45) Date of Patent: May 20, 2008

(54) IONOSPHERE DELAY MEASUREMENT USING CARRIER PHASE

(75) Inventors: George Watson, Tustin, CA (US);
Scott Graham, Orange, CA (US);
Chris Reed, Fullerton, CA (US)

(73) Assignee: L-3 Communications Corporation, Anaheim, CA (US)

( * ) Notice: Subject to any disclaimer, the term of this patent is extended or adjusted under 35 U.S.C. 154(b) by 302 days.

(21) Appl. No.: 11/127,772

(22) Filed: May 12, 2005

(65) Prior Publication Data

US 2006/0273953 A1 Dec. 7, 2006

(51) Int. Cl.
*G01S 11/00* (2006.01)
*H04J 1/00* (2006.01)
*H04J 3/00* (2006.01)
*H04B 7/10* (2006.01)

(52) U.S. Cl. .................. 342/357.02; 370/487; 370/529; 375/347

(58) Field of Classification Search ................ 370/529, 370/487; 375/347; 342/357.01–357.11
See application file for complete search history.

(56) References Cited

U.S. PATENT DOCUMENTS

| | | | | |
|---|---|---|---|---|
| 2,930,891 A | * | 3/1960 | Lakatos | ...................... 455/202 |
| 3,426,281 A | * | 2/1969 | Klein | ......................... 375/343 |
| 4,206,317 A | * | 6/1980 | Kahn | .......................... 370/201 |
| 5,056,120 A | * | 10/1991 | Taniguchi et al. | ........... 375/371 |
| 5,107,358 A | * | 4/1992 | Hodgkinson et al. | ......... 398/79 |
| 5,267,072 A | * | 11/1993 | Maleki | ....................... 398/158 |
| 5,307,515 A | * | 4/1994 | Kuo et al. | ................... 455/295 |
| 5,483,694 A | * | 1/1996 | Bartels et al. | ............... 455/295 |
| 5,721,555 A | | 2/1998 | Lennen | |
| 6,087,993 A | * | 7/2000 | Anderson et al. | ........... 343/701 |
| 6,362,874 B1 | | 3/2002 | Madsen | |

(Continued)

OTHER PUBLICATIONS

A.J. Van Dierendonck et al., "Benefits of GPS Modernization to the Atmospheric Science Community," Proceedings of the Ion 57th Annual Meeting & CIGTF 20th Biennial Guidance Test Symposium, Jun. 11-13, 2001 Albuquerque, New Mexico, Jun. 2001, pp. 382-390 XP002397039 The Institute of Navigation, Fairfax VA.

(Continued)

*Primary Examiner*—Thomas H. Tarcza
*Assistant Examiner*—Hien Ly
(74) *Attorney, Agent, or Firm*—Knobbe Martens Olson & Bear LLP (57) ABSTRACT

One or more atmospheric propagation effects are estimated by using a phase comparison between and upper sideband and a lower sideband of a modulated signal. In one embodiment, one or more propagation effects are estimated by using a phase comparison between an upper sideband and a lower sideband of a satellite navigation signal. In one embodiment, one or more ionospheric propagation effects are estimated by using a phase comparison between an upper sideband and a lower sideband of a GPS M-code signal.

31 Claims, 8 Drawing Sheets

U.S. PATENT DOCUMENTS

| | | | |
|---|---|---|---|
| 2001/0050926 A1* | 12/2001 | Kumar | 370/529 |
| 2002/0018213 A1* | 2/2002 | Ibukuro et al. | 356/484 |
| 2002/0158191 A1* | 10/2002 | Graves | 250/227.23 |
| 2002/0166956 A1* | 11/2002 | Graves | 250/227.23 |
| 2003/0067409 A1* | 4/2003 | Murphy | 342/357.01 |
| 2003/0123884 A1* | 7/2003 | Willner et al. | 398/212 |
| 2003/0201934 A1* | 10/2003 | Asher et al. | 342/357.12 |
| 2005/0080560 A1* | 4/2005 | Hatch | 701/213 |
| 2005/0083225 A1* | 4/2005 | Braubach et al. | 342/25 C |

OTHER PUBLICATIONS

Oya et al., "A New Altimeter for Mars Land Shape Observations Utilizing the Ionospheric Sounder System Onboard the Planet-B Spacecraft," Earth, Planets and Space Terra Scientific Publishing Japan, vol. 50, No. 3, 1998, pp. 229-234, XP002397040 ISSN: 1343-8832.

International Searching Authority, PCT International Search Report and Written Opinion from related International Application No. PCT/US2006/009485 dated Sep. 15, 2006, in 14 total pages.

* cited by examiner

IONOSPHERE DELAY MEASUREMENT USING CARRIER PHASE

BACKGROUND

1. Field of the Invention

The present invention relates to measurement of ionospheric propagation effects on Radio Frequency (RF) signals by comparing carrier phase between signals of different frequency, such as, for example, upper and lower sidebands of a GPS M-code signal.

2. Description of the Related Art

In the upper regions of the earth's atmosphere, ultraviolet and X-ray radiation coming from the sun interact with the atmospheric gas molecules and atoms. These interactions result in ionization giving rise to large numbers of free "negatively charged" electrons and "positively charged" atoms and molecules. The region of the atmosphere where gas ionization takes place is called the ionosphere. It extends from an altitude of approximately 50 km to about 1,000 km or higher (the upper limit of the ionospheric region is not clearly defined).

The electron density within the ionosphere is not constant. It changes with time and altitude. The ionospheric region is typically divided into sub-regions, or layers, according to the electron density. These layers are named D (50-90 km), B (90-140 km), F1 (140-210 km), and F2 (210-1,000 km), respectively, with F2 usually being the layer of maximum electron density. The altitude and thickness of these layers vary with time, as a result of the changes in the sun's radiation and the earth's magnetic field. For example, the F1 layer largely disappears during the night and is more pronounced in the summer than in the winter.

The ionosphere is a dispersive medium, which means that RF waves with the same origination point, but different frequencies, will travel at different speeds and along different ray paths as they pass through the various ionospheric layers. In the case of satellite navigation systems, such as, for example, the Global Positioning System (GPS), bending of the signal propagation path causes a relatively small range error, particularly if the satellite elevation angle is greater than 50 degrees. However, the change in the propagation speed causes a significant range error, and therefore should be accounted for. The ionosphere speeds up the phase velocity of the RF wave. The ionosphere also slows down the group velocity. The code frequency is the fundamental parameter used to determine the space vehicle (SV) range from the receiver while the carrier frequency is primarily used to maintain tracking of the SV signal and to help determine vehicle movement.

The ionospheric delay is proportional to the number of free electrons, called the Total Electron Content (TEC), along the signal path. TEC, however, depends on a number of factors, such as: the time of day; the time of year; the 11-year solar cycle; and the geographic location (electron density levels are minimum in mid-latitude regions and highly irregular in polar, auroral, and equatorial regions). As the ionosphere is a dispersive medium, it causes a delay that is frequency dependent. The delay is greater for lower frequencies than for higher frequencies. Thus, for GPS signals, the ionospheric delay is greater at the L2 carrier frequency than that of the L1 carrier frequency. Generally, ionospheric delay is of the order of 0.5 meters to 15 meters, but can reach over 150 meters under extreme solar activities, at midday, and near the horizon.

Taking advantage of the ionosphere's dispersive nature, the ionospheric delay can be determined with a relatively high degree of accuracy by measuring the "time of flight" between two RF signals of different frequencies that travel along similar paths. In GPS this dual frequency measurements may be accomplished by comparing the P(Y)-code pseudorange measurements between the L1 and L2 frequency-bands.

Single frequency band receivers cannot take advantage of the dispersive nature of the ionosphere. They can, however, use an empirical ionospheric model to correct some portion of the error introduced by dispersion. The most widely used model is the Klobuchar model, whose coefficients are transmitted as part of the navigation message. Another solution for users with single-frequency GPS receivers is to use corrections from regional networks. Such corrections can be received in real time through other communication links.

SUMMARY

These and other problems are solved by a system wherein one or more propagation effects are estimated by using a phase comparison between and upper sideband and a lower sideband of a multi-carrier modulated signal including, but not limited to, binary offset carrier signals. In one embodiment, one or more propagation effects of a dispersive medium are estimated by using a phase comparison between an upper sideband and a lower sideband of a GPS M-code signal. In one embodiment, one or more ionospheric propagation effects are estimated.

In one embodiment, hardware and software for ionospheric measurements are based on a single-band of a receiver by comparing the phase of upper and lower modulation sidebands. In one embodiment, a receiver provides improved quality, redundancy, resistance to spoofing, and/or resistance to jamming by making separate ionospheric measurements by comparing upper and lower modulation sidebands from signals transmitted using carriers in different frequency bands. In one embodiment, a GPS receiver provides ionospheric measurements by comparing the phase relationship between an upper modulation sideband and a lower modulation sideband of the L1 signal, and by separately comparing an upper modulation sideband and a lower modulation sideband of the L2 signal. This provides two relatively independent measurements for each satellite.

In one embodiment, ionospheric measurement obtained by comparing the phase of an upper modulation sideband and a lower modulation sideband is used, at least in part, to verify that a received signal was generated from a desired source (e.g., from space vehicle or artificial satellite) and not from an undesired source (e.g., a spoofer). A potential spoofer can be detected, because each satellite has an expected USB/LSB phase shift in the L1 and/or L2 M-code signals based on the satellites altitude above the horizon and the expected ionospheric properties.

In one embodiment, relative phase measurement obtained by comparing the phase of an upper modulation sideband and a lower modulation sideband, is used to assist in resolving the phase ambiguity.

In one embodiment, a phase relationship between an upper modulation sideband and a lower modulation sideband, is modulated to encode a data signal into the phase relationship.

In one embodiment, a measurement of a phase relationship between an upper modulation sideband and a lower modulation sideband, is used to evaluate phase tracking performance, relative to offset carrier signal tracking, in the presence of ionospheric distortion.

In one embodiment, ionospheric measurement obtained by comparing the phase of an upper modulation sideband and a lower modulation sideband is used to monitor relatively short-term ionospheric TEC levels and/or ionospheric TEC levels of single events, such as, for example, scintillations of the ionosphere. Natural or man-made scintillation events can be monitored.

In one embodiment, a communication system includes controlling the TEC between a signal generator and receiver such that the resulting change in phase between an upper modulation sideband and a lower modulation sideband can be decoded to obtain a data message.

In one embodiment, a measurement obtained by comparing the phase of an upper modulation sideband and a lower modulation sideband of a modulated signal is used to correct the phase between the upper modulation sideband such that the signal can be demodulated to recover the modulation data.

DETAILED DESCRIPTION

Figure 1:
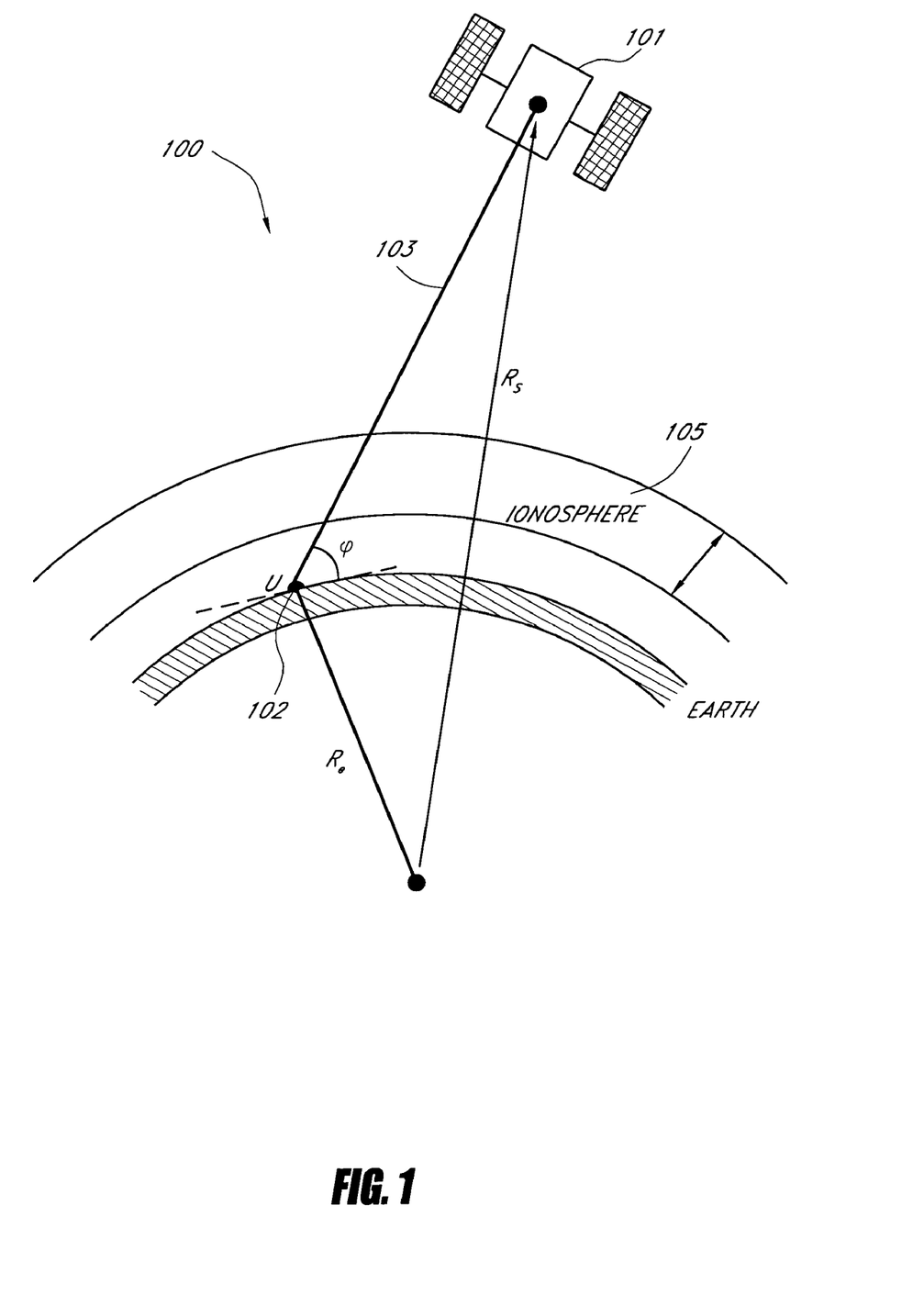
FIG. 1 shows propagation from a satellite to a ground-based or airborne receiver with ionospheric propagation.

FIG. 1 shows propagation of signals from a satellite 101 along a propagation path 103 to a receiver 102. A portion of the propagation path 103 passes through the ionosphere 105.

The ionosphere 105 is a dispersive medium, which means the path taken by the radio frequency signal is frequency dependent. Additionally, the speed at which the radio frequency travels through the ionosphere is also frequency dependent. As a result of these effects, the radio frequency bends along the trajectory from the satellite 101 and changes its group and wave velocity as the radio frequency signals propagate along the path 103 through the ionospheric layers to reach the receiver 102. In the case of satellite navigation systems, such as, for example, the Global Positioning System (GPS), bending of the signal propagation path 103 causes a relatively small range error, particularly if the satellite 101 elevation angle φ is sufficiently large. However, the change in the propagation speed causes a measurable range error. This range error is typically the largest source of error when calculating navigation solutions. The ionosphere 105 increases the phase velocity beyond the speed of light, while it reduces the group velocity. That is, the apparent distance along the path 103 will be too long if measured by the code data. The velocity changes in the radio frequency signal give rise to a pseudorange error.

The ionosphere 105 is a dispersive medium, and it causes a delay that is frequency dependent. The delay is greater for lower frequencies than for higher frequencies. Thus, for GPS signals, the L2 ionospheric delay is greater than that of L1.

Currently, two fundamental methods are used to calculate the group delay associated with the ionosphere 105. The first requires a single frequency band, an ionospheric model, and coefficients for that model supplied in the GPS data message. The other method uses the code information sent on the L1 frequency band, which is compared with the code information generated in the receiver to measure the time of flight for that signal. Then a similar code measurement is made using the code information from the L2 frequency band. The difference in time of flight between these two frequency band code signals is used to compute the total number of electrons encountered by the radio frequency wave as it traveled along its path. This difference in time of arrival between the two separate code signals from different bands is used to compensate for the atmospheric effects in the ionosphere 105. Both of these methods have advantages and disadvantages.

The single frequency band model has the simplicity of design of only needing to track one code signal. However, the accuracy of the ionosphere 105 model, is such that the model will provide at least a 50 percent reduction in the single frequency user's root mean square (RMS) position error due to ionospheric propagation effects. Additionally, the unspecified periodicity of the model coefficients typically make the ionosphere range error to be less than 25% the true value. This is a concern because, uncorrected atmosphere delays can range from 2.4 m to 5.2 m if the angle of elevation between the satellite 101 and receiver 102 is known. In extreme cases this error can increase by as much as 30 m. This atmospheric error is larger than other errors by almost a factor of two. If the angle of elevation is not known, then due to the obliqueness of the satellite 101, the error could further increase by as much as a factor of three. These range errors are acceptable for some situations but for others a more precise method of accounting for the ionosphere 105 needs to be implemented.

The dual frequency band ionosphere 105 correction method has a significantly higher level of precision than its single frequency band counterpart. This method uses the relative time of arrival delay between the L1 and L2 frequency bands launched at the same place and time. This time differential is used to calculate the Total Electron Content TEC for the ionosphere correction used in GPS measurements. This TEC number is then used for ionospheric time delay corrections. These time corrections are then used to help convert the pseudorange to the true distance between the satellite 101 and the receiver 102. The accuracy of this method depends on the noise of the system. The error introduced by this noise is on the order of ~1 m. The time delay between two frequencies ($f_1$ $f_2$) as a function of TEC is given by:

$$\Delta t = \frac{TEC}{c} (40.3081926) \left( \frac{1}{f_2^2} - \frac{1}{f_1^2} \right) \quad (1)$$

The time delay as a function of TEC for the GPS L1 and L2 signals is:

$$t_{delay} = \frac{TEC \cdot 40.3081926}{cf^2} \quad (2)$$

A beneficial feature of this method is the relatively large frequency spread between the L1 and L2 frequencies. This difference is useful in mitigating the error caused by the relative code measurement algorithms. The downside to this method is the requirement that two modulated carriers be tracked and processed. These additions result in greater hardware and software requirements than a single-band method.

Figure 2:
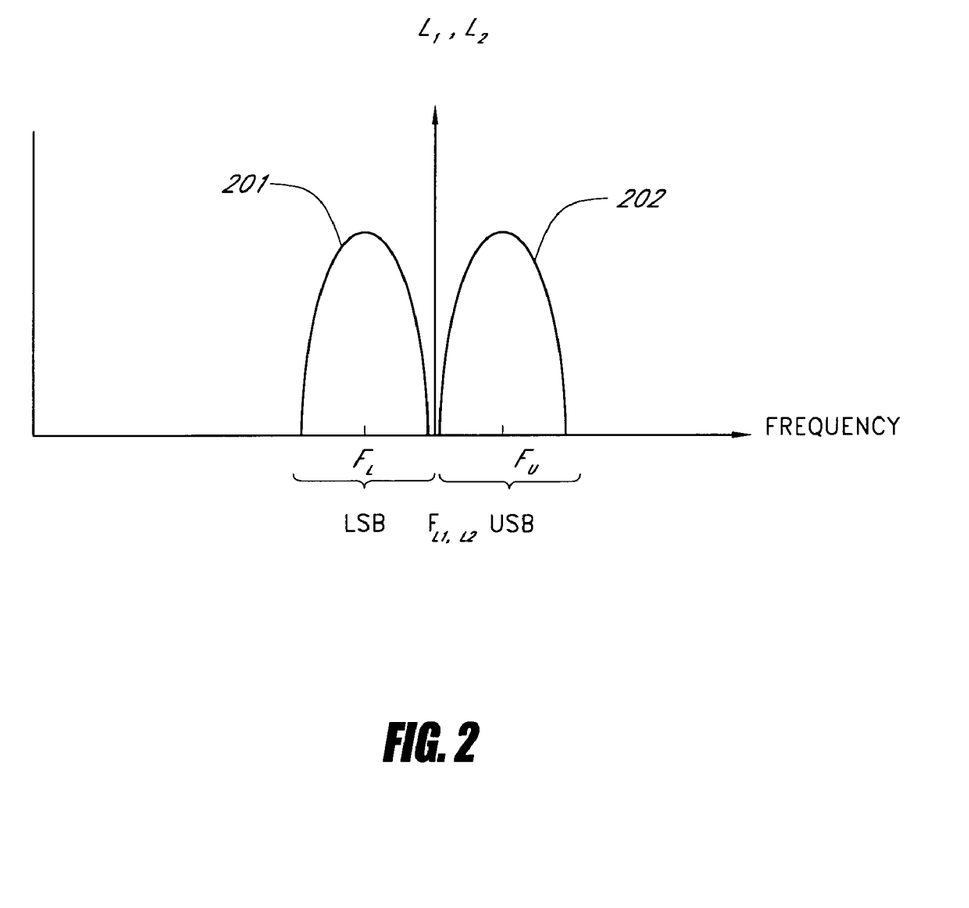
FIG. 2 shows sample spectra of the GPS L1 and L2 M-code signals.

The spectrum of a typical offset carrier modulated signal, shown in FIG. 2, has two sub-carrier modulation sideband lobes, shown as a Lower SideBand (LSB) 201 centered at $F_L$, and an Upper SideBand (USB) 202 centered at $F_U$. For example, in a GPS system the M-code signal is modulated onto both the L1 and the L2 carriers, thus providing two sub-carrier modulation sidebands with center frequencies $F_U$ and $F_L$ for each of the L1 and L2 bands. For the L1 signal, the center frequencies $F_U$ and $F_L$ of the LSB 201 and the USB 202 are approximately 153*10.23 MHz and 155*10.23 MHz respectively. For the L2 signal, the LSB and USB center frequencies $F_U$ and $F_L$ are approximately 119*10.23 MHz and 121*10.23 MHz, respectively. For either L1 and/or L2 tracking, both sidebands of the signal are coherently affected by the difference in ionospheric delay between the upper and lower sidebands.

The ionospheric delay is approximately inversely proportional to the carrier frequency squared. The ionospheric delay at L1 (1575.42 MHz), expressed in distance traveled, can fluctuate from 0.5 meter to 60 meters or more. Calculation of the difference in propagation delay between upper and lower sideband center frequencies gives pseudorange differences as small as 0.025 meters and at least as large as 1.6 meters. Translated to carrier cycles at USB or LSB frequencies, the angular displacement can range from 0.07 cycles to 8.3 cycles. When the USB and the LSB have an angular displacement of one half cycle, the USB and LSB tend to be approximately 180 degrees of phase.

The center frequencies of the LSB 201 and the USB 202 are closer together than the L1 and L2 center frequencies. Nevertheless, in one embodiment, tracking the carrier phase difference between the USB and the LSB yields ionospheric delay estimates of higher quality than those obtained by differencing the pseudorange measurements from L1 and L2 because carrier tracking is more accurate than code tracking. Thus, the ionospheric delay difference can be estimated with much smaller measurement error in the receiver 102.

The speed of a wave as it travels through the ionosphere 105 depends on the density of the plasma along the path 103 of the satellite signal. This density is commonly referred to as the total number of electrons in a square meter that the wave encounters along the path 103 between the satellite 101 and the receiver 102. This leads to a relationship shown in Equation (1) between the time the signal is launched from the satellite 101 to the time the signal is received. This total time delay can then be related to the phase of the frequency by the relationship:

$$\theta_i = t_{delay} f_i 360 = \frac{TEC \cdot 4.8403317 \cdot 10^{-5}}{f_i} \quad (3)$$

This phase delay is the total phase delay associated with that frequency. Additionally, Equation (1) shows that as the TEC increases the phase delay observed will also increase. Unfortunately, most systems can only measure the remainder of the total phase delay resulting in a value between −180° and 180°. This limitation results in lost information regarding the number of cycles the wave has undergone while traveling from the satellite 101 to the receiver 102.

Eventually the observed phase angle will increase beyond 360° and the phase angle will be indistinguishable between TEC values with similar phase angles (integer ambiguity). The amount of TECu change before a phase angle repeats is called the TEC range. TECu is the total electron count unit, which is $10^{16}$ el/m$^2$.

Figure 3:
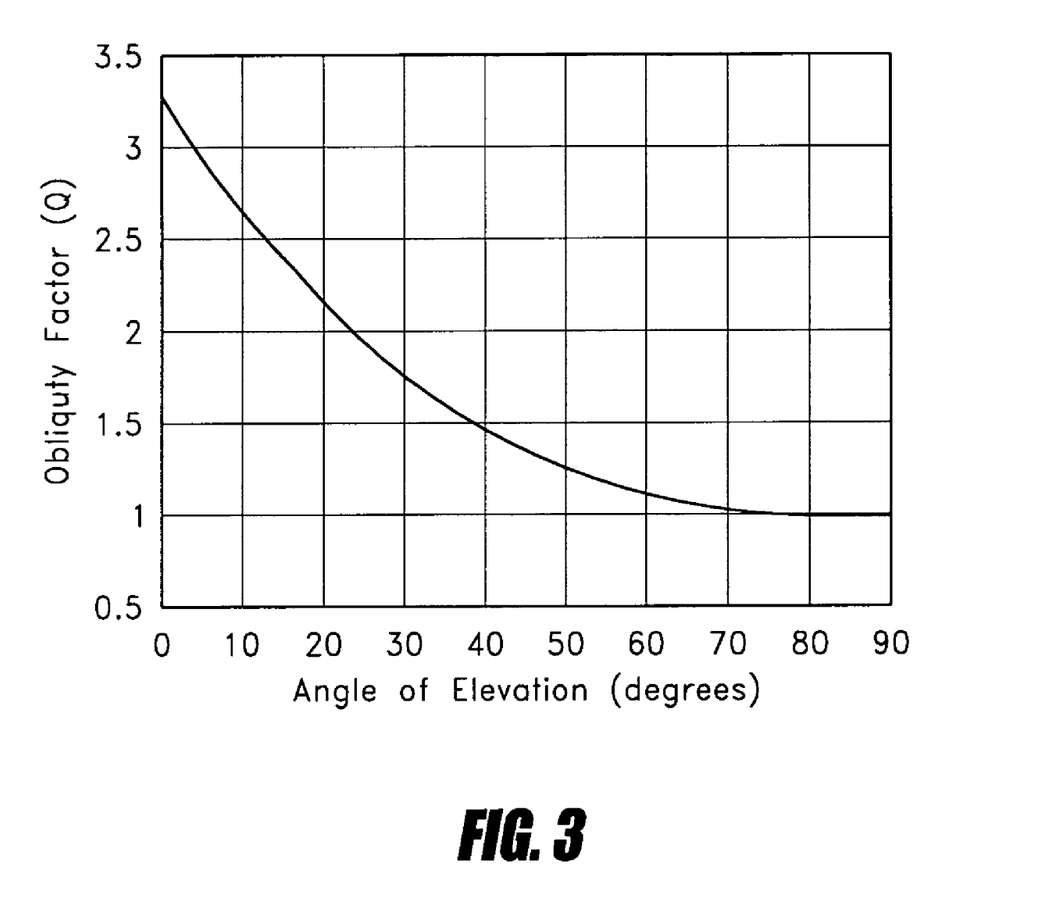
FIG. 3 shows obliqueness as a function of relative elevation angle between the satellite and the receiver.

TEC values that occur naturally and at maximum obliqueness angle can vary from 1 TECu to 300 TECu. Significant parameters that impact the TEC encountered by the GPS signals include the time of day (TOD) and angle of elevation $\phi$ of the satellite 101. As an example, to calculate the TEC as a function of time, the TOD historical data taken during a period of the Earth's greatest sunspot activity demonstrates that over the course of an hour, the mean maximum rate of increase is 0.004×10$^{16}$ el/m$^2$s. At the extreme, the upper limit to the rate of change of TEC is approximately 0.1×10$^{16}$ el/m$^2$s. However, it is unlikely that this rate would continue beyond a few minutes. The second factor that affects the TEC in the ionosphere 105 is the angle $\phi$ of the satellite 101 in reference to the receiver 102. This factor is called the obliqueness Q given by:

$$Q(\varphi) = \left(1 - \left(\frac{R_E \sin(\varphi)}{R_S}\right)^2\right)^{-\frac{1}{2}} \quad (4)$$

where $R_E$ is the Radius of the Earth and $R_S$ is the distance from center of the earth to the satellite 101.

The factor Q is a nonlinear function that depends on the angle of elevation between the satellite 101 and the receiver 102. At $\phi$=90°, Q=1 and at $\phi$=5°, Q=~3. By virtue of $\phi$, the TEC can increase significantly, and consequently the Q factor reduces a TECu range for a given frequency band by its inverse (1/Q).

Equation (5) models how the TEC levels changes over a 24 hour period (T) and angle of elevation assuming the TEC follows a sinusoidal pattern during the course of the day. This model also assumes a minimum TEC value 0 TECu with the maximum value of ~100 TECu. While a more detailed model similar to the one used for single frequency GPS measurements could be used, it is typically not necessary.

$$TEC(Q, t) \approx Q \cdot \left[50\sin\left(\frac{2\pi \cdot t}{T}\right) + 50\right] \quad (5)$$

Using Equation (5), the required TEC range to unambiguously calculate the TEC, and thus correct for the ionospheric delays, the combination of Q and t consideration is given by Equation (6), where $TEC_{max}$ is the maximum amount of TEC to be found in the ionosphere 105 (nominally 100 TECu) is:

$$TEC_{Range}(Q, t) \geq Q \cdot \frac{2 \cdot TEC_{max} \cdot t}{T} \quad (6)$$

Typically, $TEC_{max}$=100, Q={1:3}, and t={12 hr-1 hr}. The extra factor of 2 in the sine term is due to the range of allowable time before the TEC calculation could be incorrect. The range of Q is from 1-3 and the range of t is 12 h-1 h. The Q factor is a function of the satellite 101 location and cannot be controlled by the receiver 102. However, if the Q is known then it is possible to use that information to eliminate unrealistic TEC values. The 1 hour minimum is due to the uncertainty of the ionosphere 105 model based on historic data and possible fluctuations. These equations illustrate that the more well known the φ is, then the less the time of day needs to be known and vise versa. Equation (6) is useful because it gives the required TEC range to uniquely determine the TEC by using input parameters. The TECu range can be centered on the most probable TEC value and implement the carrier phase information to uniquely determine the TEC. With a properly-determined TEC an ionosphere 105 correction can be made.

To determine which carrier phase to measure when calculating the TEC of the ionosphere 105 are two competing factors to be considered. These factors can be seen in Equation (7), which gives the phase change as a function of frequency and TEC.

$$\theta(f, TEC) = \frac{TEC}{c \cdot f} \cdot 360° \cdot 40.308 \qquad (7)$$

where c=299792458 m/s.

As the frequency of a signal increases, the resolution in determining the delay of the signal increases. However, as the frequency increases, the TEC range of the signal is lowered. Table 1 lists the TEC range of M-Code frequencies and the TECu change to cause a 10° phase angle change. Therefore, the ideal signal wavelength to be implemented is a balance of these two factors as dictated by the users needs. Possible candidates for phase measurements are the carrier frequencies of the L1 USB, L1 LSB, L2 USB, L2 LSB or a combination of these frequencies.

TABLE 1

| Signal Description | Frequency | TEC Range | TECu/1° |
|---|---|---|---|
| L1 USB | 1585.65 MHz | 1.18 TECu | 0.0033 |
| L1 LSB | 1565.19 MHz | 1.16 TECu | 0.0032 |
| L2 USB | 1237.83 MHz | 0.92 TECu | 0.0026 |
| L2 LSB | 1217.37 MHz | 0.91 TECu | 0.0025 |

The phase angles of the individual frequencies are difficult to measure and increase too rapidly to be useful for TEC measurements requiring any significant TEC range.

TABLE 2

| FREQUENCY | Wavelength | Range Error (±15°) |
|---|---|---|
| 10.23 MHz (Code data) | ~29 m | ~0.5 m Time Delay Error (1.67 ns) |
| 1217.37 MHz (L2 LSB) | ~0.25 m | ~0.01 m |
| 1237.83 MHz (L2 USB) | ~0.25 m | ~0.01 m |
| 1564.19 MHz (L1 LSB) | ~0.19 m | ~0.008 m |
| 1585.65 MHz (L1 USB) | ~0.19 m | ~0.008 m |

One measurement that can consistently be made is the relative carrier phase angle ($\theta_{rel}$) between the upper side band (USB) and the lower sideband (LSB) of the L1 and L2 frequency bands as listed in Table 2. As the TEC changes, so does the relative phase angle between the USB and LSB for both L1 and L2:

$$\theta_{relL1}(TECu) = TECu \cdot 3.9903075 \qquad (8)$$

$$\theta_{relL2}(TECu) = TECu \cdot 6.575261 \qquad (9)$$

where TECu is the total electron count unit $10^{16}$ el/m².

For $\theta_{rel}$ to reach 360°, and thus, be indistinguishable from multiple cycle of the same phase, the TECu must increase by 54.8 TECu for the L2 frequency band and 90.2 TECu for the L1 frequency band. Table 3 lists the TEC range of M-Code frequencies and the TECu change to cause a 10° phase angle change. The TEC range for both L1 and L2 frequency band is less than 300 TECu range in the ionosphere 105 models. Therefore, some ionosphere 105 assumptions such as the time of day and the angle of elevation are used to measure the relative phase of the L2 or L1 band and estimate the TEC value. For instance, the nominal TEC range for the L1 band is 90 TECu.

From Equation 6, the L1 band can calculate the TEC levels within a 12 hour window (t=6 hours) provided that the Q factor does not exceed 1.8 (φ~27°).

Equation 6 also shows that if the TOD is known to within a 7.2 hr window (t=3.6 hrs), then no φ is required. When considering the L2 case, a 12 hr window limits the Q to no greater than 1.08 (φ~70°). In the L2 case, if Q=3 then a time window of 4.32 hours (t=2.16 hours) is required. Therefore, with a proper range of TOD and φ it is possible to use either the $\theta_{relL1}$ or $\theta_{relL2}$ to determine reasonable ionospheric correction errors.

TABLE 3

| Signal Description | TEC Range | TECu/10° |
|---|---|---|
| Relative L1 USB & LSB ($\theta_{relL1}$) | 90.2 TECu | 2.51 |
| Relative L2 USB & LSB ($\theta_{relL2}$) | 54.8 TECu | 1.52 |
| Simultaneous Relative USB & LSB angles ($\theta_{relL2}$, $\theta_{relL1}$) | 1533.0 TECu | 2.51 |

Figure 4:
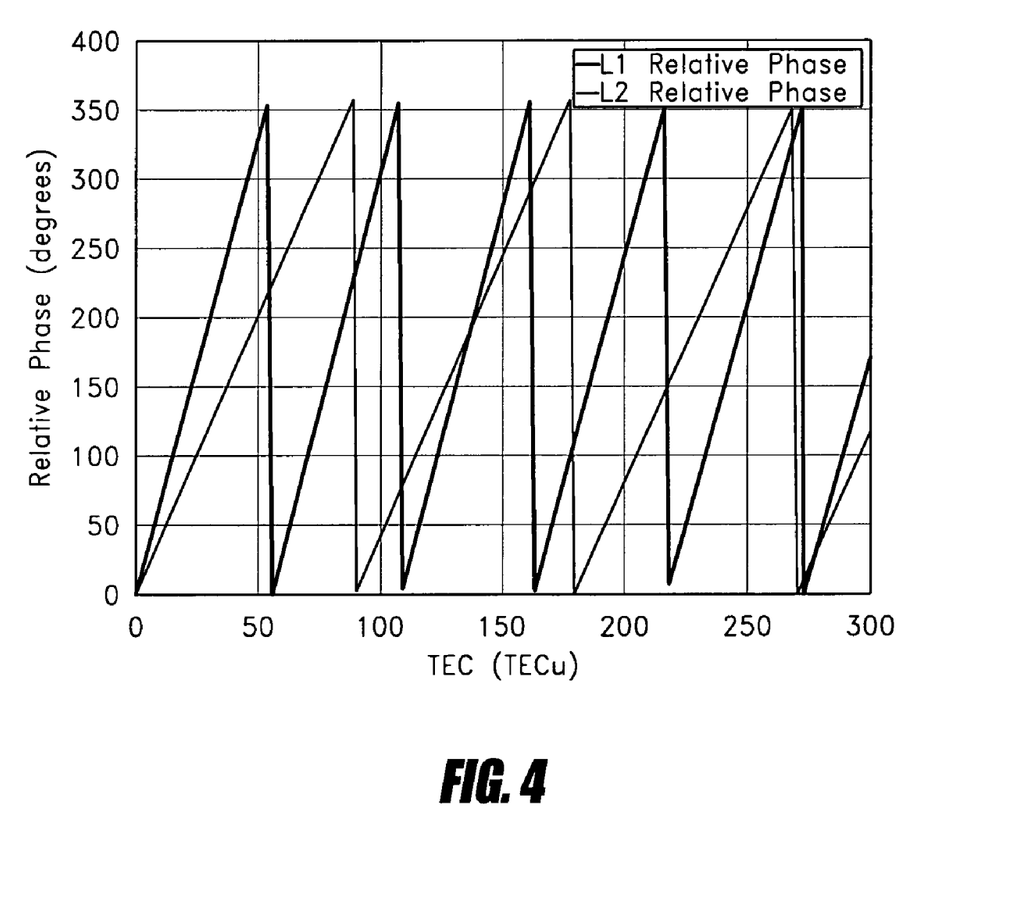
FIG. 4 shows an example of the relative phase angle of L1 and L2 as a function of total electron count.
Figure 5:
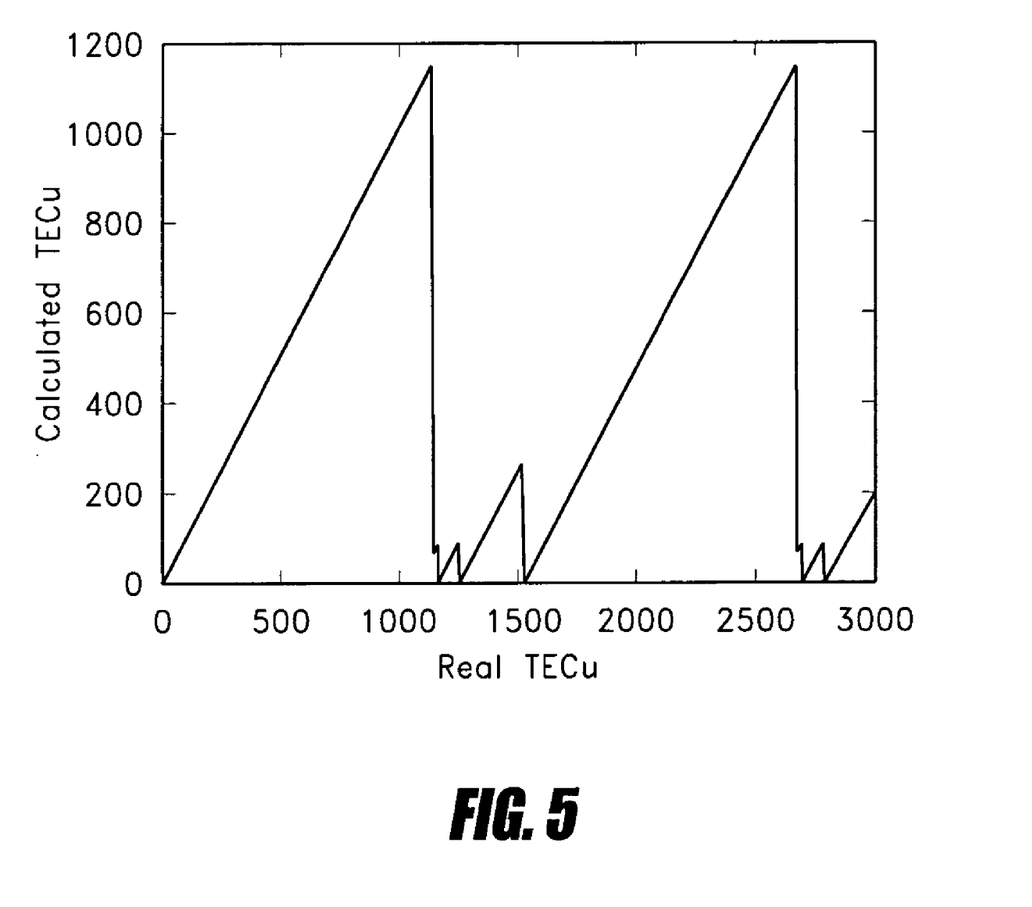
FIG. 5 shows calculated Total Electron Count (TEC) values using relative phase angles determined from actual TEC values.

While using the L1 band's $\theta_{rel}$ to make a TEC measurement is limited by its TEC range, using the $\theta_{rel}$ for both L1 and L2 it is possible to make a TEC measurement without making assumptions as to the time of day and angle of elevation. Any naturally-occurring TEC values can be uniquely determined by implementing the $\theta_{rel}$ for both the L1 and L2 frequency bands and comparing them with theoretical equations. The $\theta_{rel}$ values as a function of TEC for both the L1 and L2 frequency bands from 0°-360° are shown in FIG. 4. The periodic behavior is easily seen for both frequency bands. The L1 and L2 functions behave as shown in Equations 10 and 11, respectively. Since n and m are integers, it is possible to write a software program to go through an iterative process of incrementing the n and m numbers until agreement between the two equations is reached. This method recovers the lost cycle information for both bands.

$$TECu(\theta_{relL1}) = \frac{\theta_{relL1}}{3.9903075} + n \cdot 90.218611 \qquad (10)$$

where n = 0, 1, 2, 3, 4 ... and $$TECu(\theta_{relL2}) = \frac{\theta_{relL1}}{6.575211} + m \cdot 54.750686 \qquad (11)$$

where m = 0, 1, 2, 3, 4 ...

With this information, the TEC value using $\theta_{rel}$ from the L1 and L2 carrier frequencies can be calculated. The theoretical TECu value where the L1 $\theta_{rel}$ and L2 $\theta_{rel}$ are both near 0 occurs at 1533 TECu (n=17 and m=28). This TECu value typically does not occur under natural conditions. If the $\theta_{rel}$ can be determined within 1° then the TEC range is 1153 TECu, still well above any naturally occurring TEC level. A closer examination shows that at ~270 TECu the L1 and L2 $\theta_{rel}$ can be close enough to cause an incorrect TEC measurement. A TEC value of 100 TECu in conjunction with a Q factor of 2.7 ($\phi$=~10°) registers a TECu value of 270 and so care is taken to deal with this relatively remote possibility. A closer look at $\theta_{rel}$ error is useful for determining how much error is allowed before a TEC measurement is unreliable. While this technique does provide an ability to measure the ionosphere 105 correction without any aids such as time of day and elevation angle, it does involve the use of two frequency bands. However, using two frequency bands can improve the accuracy of the measurement, since the L1 and L2 phase measurements are relatively independent. Using two frequency bands can also provide jamming resistance, since a jammer would have to jam both bands to prevent ionospheric measurement.

Because of the dependence on the phase angle accuracy of the receiver 102, the impact of jamming on such a measurement is considered. A review of common parameters reveals that the ability to track a signal suggests that a reasonable phase angle accuracy is approximately 15°. For a relatively static receiver 102, the jamming level should exceed a J/S of 48 dB. The 15° phase error is used for evaluation of the relevant ionosphere 105 correction methods.

One metric for performance is how much error, in terms of distance, is created due to the ambiguity of the relative phase angle measurements for the L1/L2 dual-band system as compared to the single-band USB and LSB method. The relative phase angle as a function of TEC and frequency is given by Equation 12. Where $\theta_\epsilon$ is the phase error in measuring the individual carrier phases. The $\sqrt{2}$ factor is included because of the related error between measuring the carrier phase of both frequencies. Using Equation (12) and solving for TEC gives Equation (13).

$$\Delta \theta_\varepsilon \sqrt{2} = \frac{TEC \cdot 360° \cdot 40.308}{c}\left(\frac{1}{f_2} - \frac{1}{f_1}\right) \quad (12)$$

$$TEC = \frac{\sqrt{2}\Delta\theta_\varepsilon \cdot c}{360° \cdot 40.308 \cdot \gamma}; \quad (13)$$

$$\text{where } \gamma = \left(\frac{1}{f_2} - \frac{1}{f_1}\right)$$

Then using the TEC values the next step is to calculate the error time delay ($\tau_\epsilon$) from Equation 12. The leads to the cancellation of some terms and yields the relation seen in Equation 14.

$$\tau_\varepsilon = \frac{\sqrt{2}\,\Delta\theta_\varepsilon}{360° \cdot \gamma \cdot f^2} \quad (14)$$

To calculate the error in terms of distance, $\tau_\epsilon$ is multiplied by c, the free space speed of propagation of the RF signal. The velocity to multiply the $\tau_\epsilon$ is the phase velocity of the wave. However, at the considered frequencies using c is accurate to at least three significant digits. For a $\theta_\epsilon$ of 15° the calculated range errors for the dual frequency, L1 USB and LSB, L2 USB and LSB systems are listed in Table 4. The values in Table 4 indicate that the dual-band system is relatively less sensitive to $\theta_\epsilon$ than the single-band band system. The delay error sensitivity for each system is a direct result of the difference between the two frequencies being used for the TEC calculation.

TABLE 4

| Ionosphere 105 Correction Method | Considered Frequency | Spatial Delay Error (m) for $\theta_\epsilon$ = 15° | Spatial Delay Error (m) for $\theta_\epsilon$ = 1° | Spatial Delay Error (m) for $\theta_\varepsilon = \dfrac{360°}{\sqrt{2}}$ |
|---|---|---|---|---|
| Dual Frequency | L1 | 0.033 m | 0.002 m | 0.51 m |
| Dual Frequency | L2 | 0.060 m | 0.004 m | 1.02 m |
| L1 USB & LSB | L1 USB | 0.853 m | 0.057 m | 14.5 m |
| L1 USB & LSB | L1 LSB | 0.874 m | 0.058 m | 14.8 m |
| L2 USB & LSB | L2 USB | 0.849 m | 0.056 m | 14.3 m |
| L2 USB & LSB | L2 LSB | 0.877 m | 0.058 m | 14.8 m |

The delay error for the $$\frac{360°}{\sqrt{2}}$$

case shows that the spatial delay error is related to the wavelength of the frequency difference between the considered frequencies. The difference between the peaks of the GPS M code in the L1 frequency band is 20.46 MHz which results in a wavelength of ~14.6 m. The slight difference between the USB and LSB in Table 4 is attributed to the specific frequency being considered (USB or LSB). The difference between the peaks of the L2 frequency band also results in a wavelength of 14.6 m. Again the value in the last column is attributed to the specific frequency being considered. The frequency difference between the L1 and L2 frequency is 347.82 MHz which results in a wavelength of 0.86 m. Here the discrepancy in the last column between the L1 and L2 frequency is more pronounced because the two frequencies being considered differ by a greater amount than the single-band method.

Figure 6:
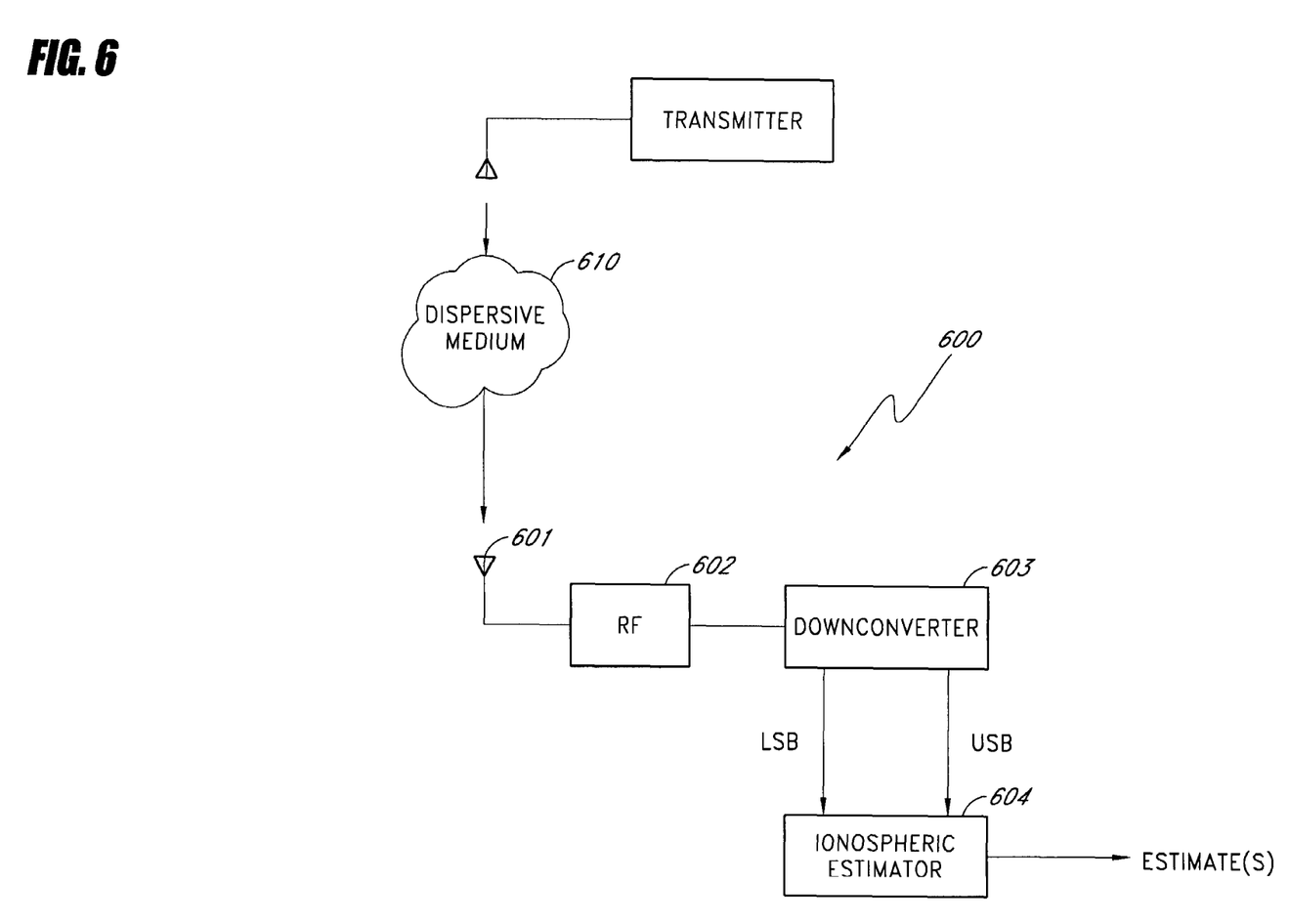
FIG. 6 is a block diagram of a satellite navigation receiver configured to estimate ionospheric parameters from lower and upper sideband components of a satellite signal.

FIG. 6 is a block diagram of a receiver 600 that uses the USB and LSB of a received signal to estimate one or more atmospheric parameters. In the receiver 600, an antenna 601 receives a Radio-Frequency (RF) signal that has propagated through a dispersive medium 610, such as, for example, the ionosphere. An RF signal from the antenna 601 is provided to an RF block 602 that provides amplification and signal conditioning. An amplified signal from the RF block 602 is provided to a downconverter 603. The down converter downconverts the RF signal to baseband and provides an LSB signal and a USB signal to an estimator 604. The estimator 604 evaluates and compares the LSB and the USB and computes one or more estimates related to how propagation through the dispersive medium affected the signal propagating through the dispersive medium 610. In one embodiment, the estimator 604 estimates one or more physical properties of the dispersive medium 610. In one embodiment, the estimator 604 uses a phase difference between the USB and the LSB to estimate properties of the dispersive medium 610. In one embodiment, the estimator 604 produces an estimate of TEC. In one embodiment, the receiver 600 is configured to compute ionospheric estimates for more than one satellite and/or using LSB and USB phase measurements on one or more frequency bands.

As described above, the ionosphere 105 is a dispersive (frequency dependent) media that affects the propagation path and velocity of radio-frequency signals, including GPS signals. The relationship between time delay, frequency, and total electron count (TEC) is shown in Equation 15. The positive or negative value for $t_{delay}$ corresponds to whether the signal being considered is a data signal (negative value, delayed), or a carrier wave (positive value, advanced). The TEC is defined as the number of electrons present between the transmitter and receiver 102 along a square meter column. The factors that influence the TEC are the amount of ionization in the atmosphere and the distance propagated through the ionization (where the distance is related to the angle of elevation between the receiver 102 and the satellite 101).

$$t_{delay} = \pm \frac{TEC \cdot 40.3}{cf^2} \qquad (15)$$

The ionospheric distortion of GPS is a well documented effect on traditional GPS signals. However, the implementation of the M Code signal structure presents a new challenge for GPS receivers. The M-code signal has two sidebands, the upper sideband (USB) centered at 1585.65 MHz above the RF carrier, and the lower sideband (LSB) centered at 1565.19 MHz below the RF carrier. The dispersive nature of the ionosphere 105 introduces a phase difference between the LSB and the USB.

For the M-code signals, the group delay between the LSB and USB is only a few nanoseconds and is not measurably significant for realistic TEC values. However, this delay can impact the carrier frequencies to the point where the time delays between the LSB and the USB are disruptive to the combining of the sidebands for correlation and/or demodulation purposes. A receiver with tracking channels for both USB and LSB correlators can provide carrier phase tracking between the LSB and the USB of the L1 M-code signal and/or the L2 M-code signal.

To compensate for this effect, a carrier phase correction algorithm on the downconverted baseband signal is applied to maximize the correlation values.

Figure 7A:
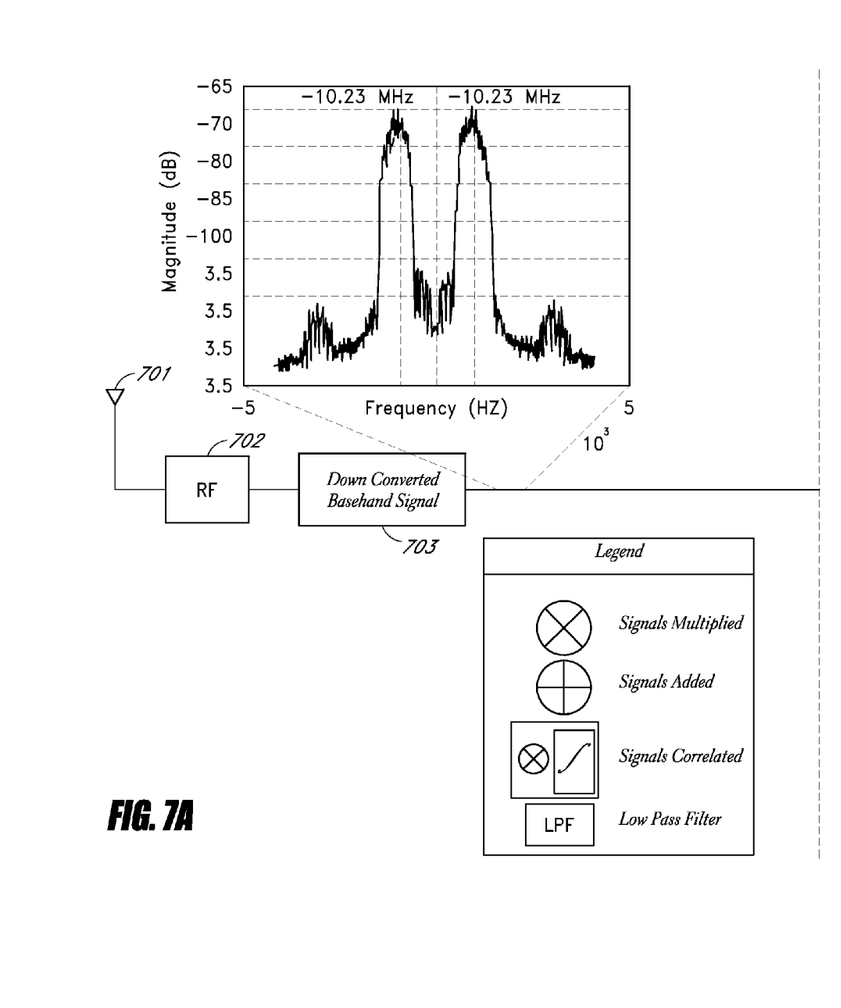
FIG. 7 is a signal processing block diagram of a GPS receiver configured to provide ionospheric carrier phase correction.
Figure 7B:
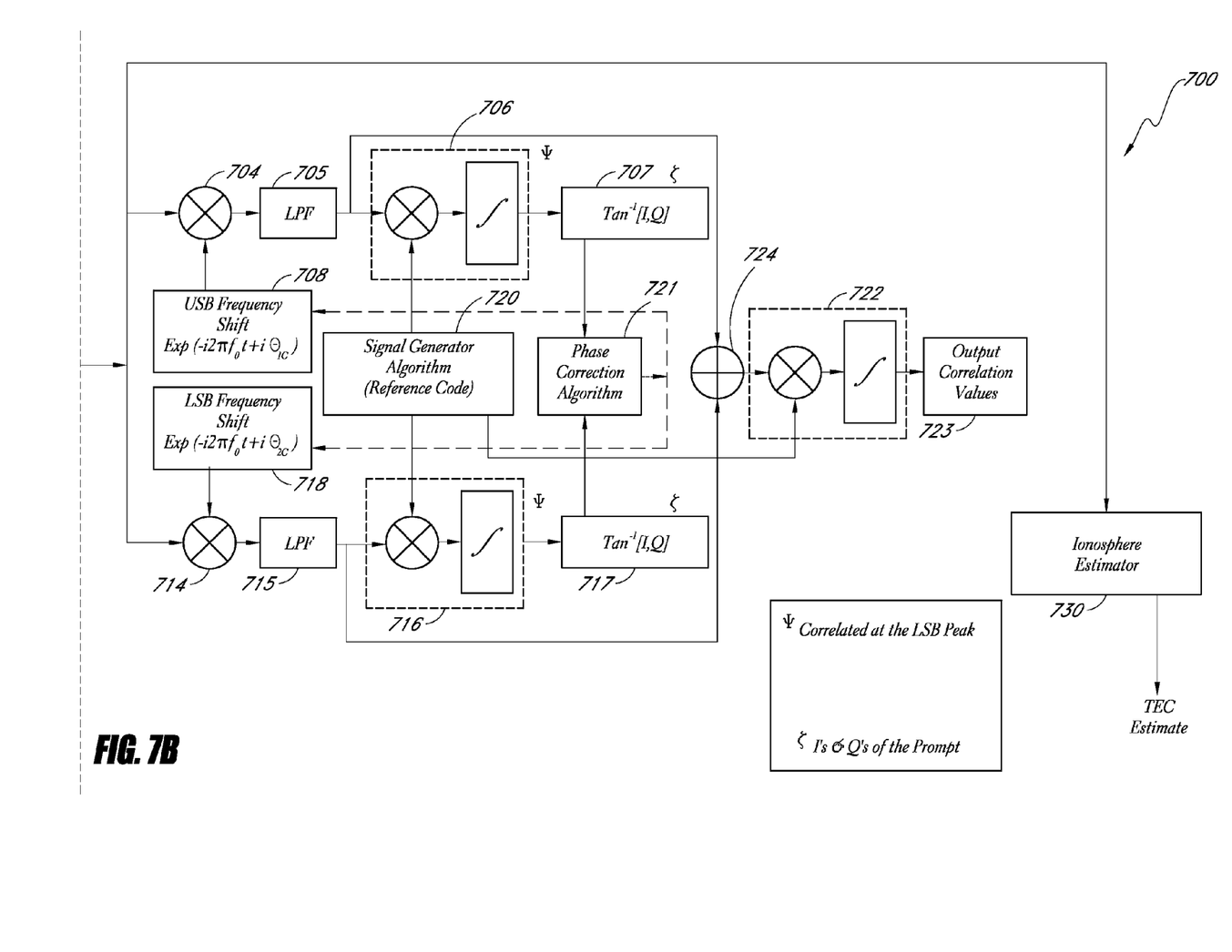

FIG. 7 is a block diagram of a GPS receiver 700 configured to provide phase correction and estimation of ionospheric properties. In the receiver 700, an antenna 701 provides an RF signal to an RF amplifier module 702. An output of the RF amplifier module 702 is provided to a downconverter 703. A downconverted signal from the downconverter 702 is provided to a first input of a USB mixer 704, to a first input of an LSB mixer 714, and to an ionospheric estimator 730.

An output of the USB mixer 704 is provided to a USB lowpass filter 705. An output of the USB lowpass filter 705 is provided to a first input of a USB correlator 706. An output of the USB correlators 706 is provided to a USB phase discriminator 707. An output of the USB phase discriminator 707 is provided to a USB input of a phase correction estimator 721.

An output of the LSB mixer 714 is provided to an LSB lowpass filter 715. An output of the LSB lowpass filter 715 is provided to a first input of an LSB correlator 716. An output of the LSB correlators 716 is provided to an LSB phase discriminator 717. An output of the LSB phase discriminator 717 is provided to an LSB input of the phase correction estimator 721.

A phase correction output of the phase correction estimator is provided to a USB frequency shifter 708 and to an LSB frequency shifter 718. A USB local oscillator (LO) output of the USB frequency shifter 708 is provided to a second input of the USB mixer 704. An LSB LO output of the LSB frequency shifter 718 is provided to a second input of the LSB mixer 714.

The ionospheric estimator 730 compares the phase of the USB with the LSB and uses the phase difference between the USB and the LSB to estimate one or more ionospheric parameters.

The phase and/or frequency of the LO signal from the USB frequency shifter 708 are configured such that the USB mixer 704 in combination with the USB lowpass filter 705 operates as a phase-shifting demodulator to extract the USB signal from the down-converted signal and to adjust the phase of the USB signal to a desired value. Similarly, the phase and/or frequency of the LO signal from the LSB frequency shifter 718 are configured such that the LSB mixer 714 in combination with the LSB lowpass filter 715 operates as a phase-shifting demodulator to extract the LSB signal from the down-converted signal and to adjust the phase of the LSB signal to a desired value The phase-adjusted USB signal from the USB lowpass filter 705 and the phase-adjusted LSB signal from the LDB lowpass filter 715 are provided to a combiner 724. An output of the combiner 724 is provided to a first input of a correlator 722. A reference code signal generator 720 provides signal inputs to second inputs of the USB correlators 706, 716, and 722. An output of the correlator 722 comprises M-code data.

In the system 700, the baseband signal is split into upper and lower paths. The upper path is mixed with $\exp[-i2\pi f_0 t + i\theta_1]$ to center the USB at zero frequency. Then a digital low pass filter is used to remove the LSB sideband. The sideband code will then be correlated against the receiver 102 replica code and the phase of the USB due to traveling through the ionosphere 105 will be measured. A similar process will be implemented for the LSB using $\exp[+i2\pi f_0 t + i\theta_2]$. The resulting phases from the USB and LSB paths will be measured and inputted into the phase correction algorithm. It is paramount that the inverse tangent function needs to have a 4-quadrant capability and is computed from the even correlator outputs. The purpose of the phase correction algorithm is to read in the phases from USB and LSB and then output correction phases to the USB path and LSB path so the phase difference between the two sidebands is zero. With the proper phase correction in place the USB and LSB sidebands can then be coherently combined and a 3 dB improvement in correlation can then be realized.

In one embodiment, a programmable modulation sideband phase adjustment is provided. This adjustment can be implemented during the phase correction process. Normally, the phase correction terms for USB and LSB are adjusted to ensure that the phase difference between the USB and LSB is small (e.g., substantially zero). However, any desired phase difference between the USB and LSB sideband carrier frequency can be provided. In one embodiment, the phase inputs are variable in time at a rate of 1 Hz or more. In one embodiment, this phase adjustment is applied to the modulation sidebands but not the code frequency.

In one embodiment, the receiver 700 with tracking channels for both USB and LSB correlators is used to provide carrier phase tracking between the LSB 210 and the USB 202 of the L1 M-code signal and/or the L2 M-code signal. This tracking channel can sequence through one or more satellites 101 and provide ionospheric correction measurements, via carrier phase corrections, for each satellite. The rate of change of ionospheric delay is such that the phase updates typically need not occur more quickly than once every few seconds. This embodiment uses the relative phase angles ($\theta_{rel}$) between the USB and the LSB of the L1 and/or L2 frequency bands. Using relative carrier-phase measurement between the USB and the LSB for either the L1 of L2 frequency band, it is possible provide dual-frequency ionosphere data while maintaining the simplicity of a single-band receiver.

The phase corrector 721 makes ionosphere 105 corrections of the USB and LSB signals. These corrections improve the correlation values for the coherently combined USB and LSB sidebands. The phase corrector:

Measures the USB phase ($\theta_1$) and the LSB phase ($\theta_2$).

Determines the desired final phase $\theta_f$ for the USB and LSB sidebands. Typically, $\theta_f=0$.

Determines the phase corrections ($\theta_{1C}$, $\theta_{2C}$) to insert so that the final USB phase and final LSB phase are equal to $\theta_f$ (Equations 16, 17).

$$\theta_{1C}=\theta_{1f}-\theta_1 \quad (16)$$

$$\theta_{2C}=\theta_{2f}-\theta_2 \quad (17)$$

Writes the phase values ($\theta_{1C}$, $\theta_{2C}$) to the control register.

Repeats the process at a desired update rate to maintain coherent phase during ionospheric variations. In one embodiment, the desired update rate is at least 1 Hz.

Although described in terms of specific embodiments, one of ordinary skill in the art will recognize that other embodiments and variations are within the scope of the invention. For example, the present invention is not limited to satellite systems or systems that propagate through the ionosphere, but, rather, can be used in connection with any system where waves propagate through a dispersive medium. The present invention is not limited to satellite navigation systems, but can be used in connection with other communication or navigation systems. The system is not limited to GPS systems, but can be used with other navigation systems, such as, for example, Galileo, GLONASS, etc. The system is not limited to any particular modulation type and applies to any multicarrier modulation type including, but not limited to, offset carrier, binary offset carrier, Manchester encoded, orthogonal frequency division multiplexing, etc. Thus, the invention is limited only by the claims.

What is claimed is:

1. A method for compensating for distortion from a dispersive medium, comprising:

receiving a modulated radio-frequency (RF) signal that has propagated through said dispersive medium, wherein the modulated RF signal is received from a satellite source;

downconverting said modulated RF signal to produce a baseband signal, wherein the baseband signal preserves an upper sideband and a lower sideband present in the modulated RF signal;

tracking a first downconverted carrier phase corresponding to the upper sideband;

tracking a second downconverted carrier phase corresponding to the lower sideband, wherein at least one of the first tracked downconverted carrier phase or the second tracked downconverted carrier phase is used to determine a range measurement to the satellite source;

extracting a phase difference between said first downconverted carrier phase and said second downconverted carrier phase; and determining a correction for the range measurement to the satellite source based at least in part on said extracted phase difference.

2. The method of claim 1, wherein said modulated RF signal is received from a navigation satellite.

3. The method of claim 1, wherein said modulated signal comprises a GPS M-code subcarrier signal, and wherein the upper sideband and the lower sideband correspond to the M-code subcarrier signal.

4. The method of claim 1, wherein said modulated RF signal comprises a GPS L1 M-code subcarrier signal, and wherein the upper sideband and the lower sideband correspond to the M-code subcarrier signal.

5. The method of claim 1, wherein said modulated RF signal comprises a GPS L2 M-code subcarrier signal, and wherein the upper sideband and the lower sideband correspond to the M-code subcarrier signal.

6. The method of claim 1, wherein said modulated RF signal comprises a Galileo signal.

7. The method of claim 1, wherein said dispersive medium comprises at least a portion of the earth's ionosphere.

8. The method of claim 1, wherein said dispersive medium comprises a plasma.

9. The method of claim 1, wherein said dispersive medium comprises a partially ionized medium.

10. The method of claim 1, wherein determining the correction for the range measurement further comprises determining a total electron content for a signal path from the satellite source.

11. The method of claim 1, further comprising, using said phase difference to correct a phase between said upper sideband and said lower sideband.

12. The method of claim 1, further comprising, using said phase difference to correct a phase between said upper sideband and said lower sideband to condition said second upper sideband and said lower sideband for demodulation.

13. The method of claim 1, further comprising, using said phase difference to adjust a phase of at least said upper sideband or said lower sideband such that after adjustment said upper sideband and said lower sideband are substantially in phase.

14. The method of claim 1, further comprising, using said phase difference to adjust a phase of at least said upper sideband or said lower sideband such that after adjustment said upper sideband and said lower sideband are substantially out of phase.

15. The method of claim 1, further comprising:
generating an expected phase difference between the upper sideband and the lower sideband;
comparing the expected phase difference to the extracted phase difference; and
detecting the presence of a spoofing signal in response to the comparison.

16. A receiver, comprising:
an antenna configured to receive a radio-frequency (RF) signal from a satellite source, wherein the RF signal has propagated through a dispersive medium, wherein the RF signal is modulated;
a downconverter configured to downconvert said radio-frequency signal to produce a baseband signal, wherein the baseband signal has an upper sideband and a lower sideband;
a first tracker configured to track a first downconverted carrier phase corresponding to the upper sideband;
a second tracker configured to track a second downconverted carrier phase corresponding to the lower sideband, wherein at least one of the first tracked downconverted carrier phase or the second tracked downconverted carrier phase is used to determine a range measurement to the satellite source;
a phase comparator configured to evaluate a phase difference between said first downconverted carrier phase and said second downconverted carrier phase; and
an estimator configured to determine a correction for the range measurement to the satellite source based at least in part on said extracted phase difference.

17. The receiver of claim 16, wherein said radio-frequency signal comprises a GPS M-code subcarrier signal, and wherein the upper sideband and the lower sideband correspond to the M-code subcarrier signal.

18. The receiver of claim 16, wherein said radio-frequency signal comprises a GPS L1 M-code subcarrier signal, and wherein the upper sideband and the lower sideband correspond to the M-code subcarrier signal.

19. The receiver of claim 16, wherein said radio-frequency signal comprises a GPS L2 M-code subcarrier signal, and wherein the upper sideband and the lower sideband correspond to the M-code subcarrier signal.

20. The receiver of claim 16, wherein said radio-frequency signal comprises a Galileo signal.

21. The receiver of claim 16, wherein said dispersive medium comprises at least a portion of the earth's ionosphere.

22. The receiver of claim 16, wherein said dispersive medium comprises a plasma.

23. The receiver of claim 16, wherein said dispersive medium comprises a partially ionized medium.

24. The receiver of claim 16, wherein the estimator is further configured to determine a total electron content of a portion of an ionosphere for a signal path from the satellite source.

25. The receiver of claim 16, further comprising, a phase shifter, said receiver configured to provide said phase difference to said phase shifter, said phase shifter configured to correct a phase between said upper sideband and said lower sideband.

26. The receiver of claim 16, further comprising a phase shifter, said receiver configured to provide said phase difference to said phase shifter, said phase shifter configured to correct a phase between said upper sideband and said lower sideband to condition said upper sideband and said lower sideband for demodulation.

27. The receiver of claim 16, further comprising, a phase shifter, said receiver configured to provide said phase difference to said phase shifter, said phase shifter configured to adjust a phase of at least said upper sideband or said lower sideband such that after adjustment said upper sideband and said lower sideband are substantially in phase.

28. The receiver of claim 16, further comprising, a phase shifter, said receiver configured to provide said phase difference to said phase shifter, said phase shifter configured to adjust a phase of at least said upper sideband or said lower sideband such that after adjustment said upper sideband and said lower sideband are substantially out of phase.

29. The receiver of claim 16, further comprising:
a phase shifter, said receiver configured to provide said phase difference to said phase shifter, said phase shifter configured to correct a phase between said upper sideband and said lower sideband to produce a phase-corrected signal; and
a demodulator configured to demodulate said phase-corrected signal.

30. The receiver of claim 16, further configured to estimate ionospheric properties using signals received from a plurality of satellites.

31. The receiver of claim 16, wherein said radio-frequency signal is received from a navigation satellite.

* * * * *